US010247167B2

(12) United States Patent
Heo et al.

(10) Patent No.: US 10,247,167 B2
(45) Date of Patent: Apr. 2, 2019

(54) INDEPENDENT POWER GENERATING METHOD USING WATER PRESSURE AND VAPOR, AND GENERATING DEVICE THEREOF

(71) Applicants: Sang Chae Heo, Busan (KR); Bi Ung Heo, Busan (KR)

(72) Inventors: Sang Chae Heo, Busan (KR); Bi Ung Heo, Busan (KR)

( * ) Notice: Subject to any disclaimer, the term of this patent is extended or adjusted under 35 U.S.C. 154(b) by 0 days.

(21) Appl. No.: 15/309,309

(22) PCT Filed: Apr. 3, 2015

(86) PCT No.: PCT/KR2015/003359
§ 371 (c)(1),
(2) Date: Nov. 7, 2016

(87) PCT Pub. No.: WO2015/170830
PCT Pub. Date: Nov. 12, 2015

(65) Prior Publication Data
US 2017/0074229 A1    Mar. 16, 2017

(30) Foreign Application Priority Data
May 7, 2014    (KR) .......................... 10-2014-0054272

(51) Int. Cl.
*F03B 13/00* (2006.01)
*F03B 13/06* (2006.01)
(Continued)

(52) U.S. Cl.
CPC .............. *F03B 13/06* (2013.01); *F03B 13/00* (2013.01); *F22B 31/00* (2013.01); *F22B 33/18* (2013.01);
(Continued)

(58) Field of Classification Search
USPC .............. 290/52, 54; 60/325, 512, 655, 671
See application file for complete search history.

(56) References Cited

U.S. PATENT DOCUMENTS 4,116,005 A * 9/1978 Willyoung ............ F01K 23/061
122/4 D
4,341,490 A * 7/1982 Keeling ................. E02B 13/00
405/36
(Continued)

FOREIGN PATENT DOCUMENTS

KR     10-2005-0062843     6/2005
KR     20-2010-0003189     3/2010
(Continued)

OTHER PUBLICATIONS

International Search Report dated Jun. 2, 2015 From the Korean Intellectual Property Office Re. Application No. PCT/KR2015/003359.

*Primary Examiner* — Pedro J Cuevas
(74) *Attorney, Agent, or Firm* — Maschoff Brennan

(57) ABSTRACT

The present invention relates to an independent power generating method using water pressure and vapor, and a generating device thereof, which: sequentially circulate water by using a head drop of water and high-pressure vapor so as to continuously generate power, and generate power with a natural head drop caused by the gravity of water and, simultaneously, produce power with vapor; and naturally increase, condense, and reuse the vapor so as to hardly waste water resources such that power can be efficiently generated by efficiently rotating water wheels connected to an electric generator.

2 Claims, 2 Drawing Sheets

(51) Int. Cl.
*F22B 31/00* (2006.01)
*H02K 7/18* (2006.01)
*F22B 33/18* (2006.01)

(52) U.S. Cl.
CPC ............ H02K 7/1823 (2013.01); *Y02E 10/22* (2013.01); *Y02E 60/17* (2013.01); *Y02P 80/154* (2015.11); *Y02P 90/50* (2015.11)

(56) References Cited

U.S. PATENT DOCUMENTS

| | | | | |
|---|---|---|---|---|
| 4,408,960 A * | 10/1983 | Allen | ........................ | F04F 1/10 417/125 |
| 4,443,707 A * | 4/1984 | Scieri | ..................... | F03B 13/06 290/4 A |
| 4,627,241 A * | 12/1986 | Johnston | ................... | F03G 6/00 60/656 |
| 4,637,212 A * | 1/1987 | Aguet | ..................... | F02C 3/205 60/655 |
| 4,698,973 A * | 10/1987 | Johnston | ................... | F03G 6/00 417/125 |
| 4,739,620 A * | 4/1988 | Pierce | ....................... | F03G 6/00 60/641.8 |
| 4,805,410 A * | 2/1989 | Johnston | ................... | F01K 9/00 60/651 |
| 5,431,016 A * | 7/1995 | Simpkin | .................. | F01K 23/02 60/644.1 |
| 5,461,858 A * | 10/1995 | Johnson | ................. | F01K 27/005 60/325 |
| 5,551,237 A * | 9/1996 | Johnson | ................. | F01K 27/005 126/672 |
| 5,603,218 A * | 2/1997 | Hooper | ................... | F01K 23/04 60/651 |
| 5,713,202 A * | 2/1998 | Johnson | ................. | F01K 27/005 417/381 |
| 5,865,086 A * | 2/1999 | Petichakis | .............. | B63H 11/02 60/325 |
| 5,953,917 A * | 9/1999 | Murphy | .................... | F03G 6/00 60/641.15 |
| 6,073,445 A * | 6/2000 | Johnson | .................... | F02C 6/16 415/202 |
| 6,182,615 B1 * | 2/2001 | Kershaw | ................. | F01B 21/00 123/19 |
| 6,397,600 B1 * | 6/2002 | Romanelli | .............. | F01K 25/08 60/651 |
| 6,594,997 B2 * | 7/2003 | Romanelli | .............. | F01K 25/08 60/651 |
| 6,739,131 B1 * | 5/2004 | Kershaw | ................. | F01B 21/00 417/379 |
| 7,021,900 B2 * | 4/2006 | Prueitt | ....................... | F04F 1/04 417/137 |
| 8,127,542 B1 * | 3/2012 | Dolcimascolo | ......... | F03B 13/06 60/398 |
| 8,276,383 B2 * | 10/2012 | Sami | ....................... | F01K 25/06 60/651 |
| 8,736,097 B1 * | 5/2014 | Schrader | ............... | F03B 17/005 290/43 |
| 9,234,437 B1 * | 1/2016 | Hanna | ..................... | F01D 15/10 |
| 9,322,299 B2 * | 4/2016 | Conry | .................... | F01K 11/02 |
| 9,441,606 B2 * | 9/2016 | Hanna | ..................... | F03B 13/10 |
| 9,453,411 B2 * | 9/2016 | Courson | .................. | F01L 7/021 |
| 2006/0150625 A1 * | 7/2006 | Behrens | ................ | F03B 17/005 60/495 |
| 2011/0266804 A1 * | 11/2011 | Dolcimascolo | ......... | F03B 13/06 290/54 |
| 2013/0233259 A1 * | 9/2013 | Courson | .................. | F01L 7/021 123/54.3 |
| 2017/0030193 A1 * | 2/2017 | Courson | .................. | F01L 7/021 |
| 2018/0023423 A1 * | 1/2018 | Singh | ........................ | F28B 1/06 417/410.1 |
| 2018/0023540 A1 * | 1/2018 | Lai | ........................... | F03B 13/10 290/54 |

FOREIGN PATENT DOCUMENTS

| | | |
|---|---|---|
| KR | 10-2010-0119294 | 11/2010 |
| KR | 10-2012-0042788 | 5/2012 |
| KR | 10-2012-0136994 | 12/2012 |
| WO | WO 2015/170830 | 11/2015 |

* cited by examiner

INDEPENDENT POWER GENERATING METHOD USING WATER PRESSURE AND VAPOR, AND GENERATING DEVICE THEREOF

RELATED APPLICATIONS

This application is a National Phase of PCT Patent Application No. PCT/KR2015/003359 having International filing date of Apr. 3, 2015, which claims the benefit of priority of Korean Patent Application No. 10-2014-0054272 filed on May 7, 2014. The contents of the above applications are all incorporated by reference as if fully set forth herein in their entirety.

FIELD AND BACKGROUND OF THE INVENTION

The present invention relates to an independent power generating method using water pressure and vapor, a generating device thereof, and more particularly, to an independent power generating method and a generating device thereof, which enables an electric generator to perform power generation by rotating a water wheel using water pressure and vapor, to thereby produce electric power.

In general, an electric generator serves to convert mechanical energy transferred from an external power source into electrical energy, and an example of the external power source may include a turbine, a water wheel, an electric motor, an engine, etc.

A method of generating electrical energy using this external power source may be performed by hydroelectric power generation using potential energy difference of water, power generation directly using a natural force such as wind-power generation using a wind force, and artificial power generation such as thermal power generation and nuclear power generation using a natural source including petroleum, coal, or uranium.

As well known, such a generating principle of the electric generator using the external power source is based on a relative relationship between a magnetic force and electrons in a conductor. When magnetic flux is disconnected by the conductor, a voltage is induced between opposite ends of the conductor, and a current flows by the induced voltage. In this case, a magnitude of the induced voltage E is related to a magnetic flux density B, a length I of the conductor in the magnetic field, and a movement speed V of the conductor. Accordingly, external power is required for a power-generating operation of the electric generator, and it is necessary to continuously supply mechanical energy from the external power source.

However, in the case of the thermal power generation or the nuclear power generation, an electric generator is driven by using thermal energy generated by combustion or a nuclear reaction of a natural resource. Accordingly, a conversion efficiency into electrical energy is deteriorated due to a loss of thermal energy and many environment-related problems associated with the development such as global warming caused by carbon dioxide generated by fuel combustion and reflective power leakage of nuclear reactions or processing problems of nuclear waste have emerged.

In addition, among typical fossil fuel, reserves of a natural resource such as coal or oil have a specific limit, and thus its available energy is expected to be depleted, which causes a high-price trend in which oil price continuously increases. As a result, serious problems that a new alternative energy needs to be developed has been raised, and the use of natural energy using hydro, wind or solar power, etc. is restricted in relation to the environment.

A Patent Application Publication No. 2012-86004 was disclosed as one of the conventional arts.

SUMMARY OF THE INVENTION

Technical Problem

The present invention are directed to provide an independent power generating method and a generating device thereof using water pressure and vapor, having advantages of being capable of producing power by power generation of an electric generator by efficiently rotating a water wheel connected with the electric generator through circulation of water that can be continuously used as an external power source of the electric generator.

Technical Solution

An exemplary embodiment of the present invention provides an independent power generating method and a generating device thereof using water pressure and vapor, including: a water tank disposed at a predetermined height to have potential energy; a first water wheel disposed at an exhaust side of the water tank to vertically face the water tank and to rotate by head drop of water, an electric generator being coupled to a rotating shaft thereof; a heating boiler disposed to communicate with a lower portion of the first water wheel to generate vapor by heating inlet water; a vapor wheel disposed to rotate by high-pressure vapor ejected by communicating with a vapor exhausting end of the heating boiler, an electric generator being coupled to a rotating shaft thereof; a condensing tank mounted at an upper side of the vapor wheel to have a first side communicating with the vapor wheel to condense vapor and to allow condensate water to flow toward a second side to exhaust it; and a second water wheel disposed to downwardly communicate with an exhaust side of the condensing tank, to rotate by head drop of the condensate water, a rotating shaft being coupled to the electric generator, to downwardly communicate with the water tank.

Advantageous Effects

Accordingly, the independent power generating method and the generating device thereof the present invention, thereby having an effect of producing power by effectively rotating the water wheel connected with the electric generator through water circulation. Specifically, when an amount of water is allowed to vertically downwardly flow from the water tank, the first water wheel is rotated by water pressure depending on potential energy of the flowing water, and thus first power is generated by the electric generator connected with a rotating shaft of the first water wheel; the water that completes first power generation is heated in the heating boiler to generate high-pressure vapor which rotates the vapor wheel, and thus-generated torque is applied to the electric generator connected with the rotating shaft of the vapor wheel to generate second power; the vapor that completes second power generation is exhausted into the condensing tank, condensate water obtained by condensing the vapor is allowed to vertically downwardly flow, thus-generated torque is applied to the electric generator connected with the rotating shaft of the second water wheel to generate third power;

and the water that completes third power generation is allowed to flow in the water tank to perform a continuous power generation circulating operation.

DESCRIPTION OF SPECIFIC EMBODIMENTS OF THE INVENTION

Figure 1:
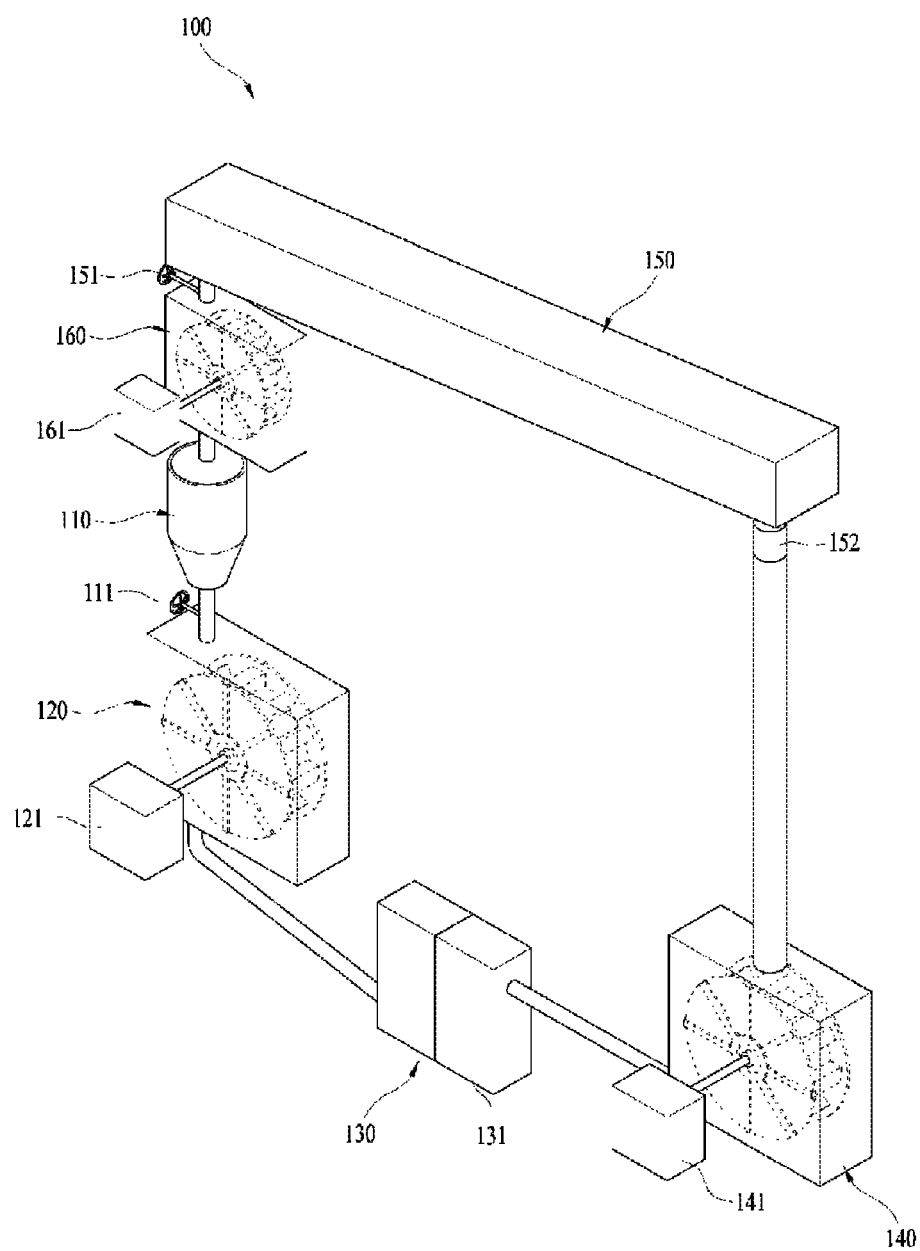
FIG. 1 is a perspective view illustrating an independent power generating method and a generating device thereof using water pressure and vapor according to the present invention.
Figure 2:
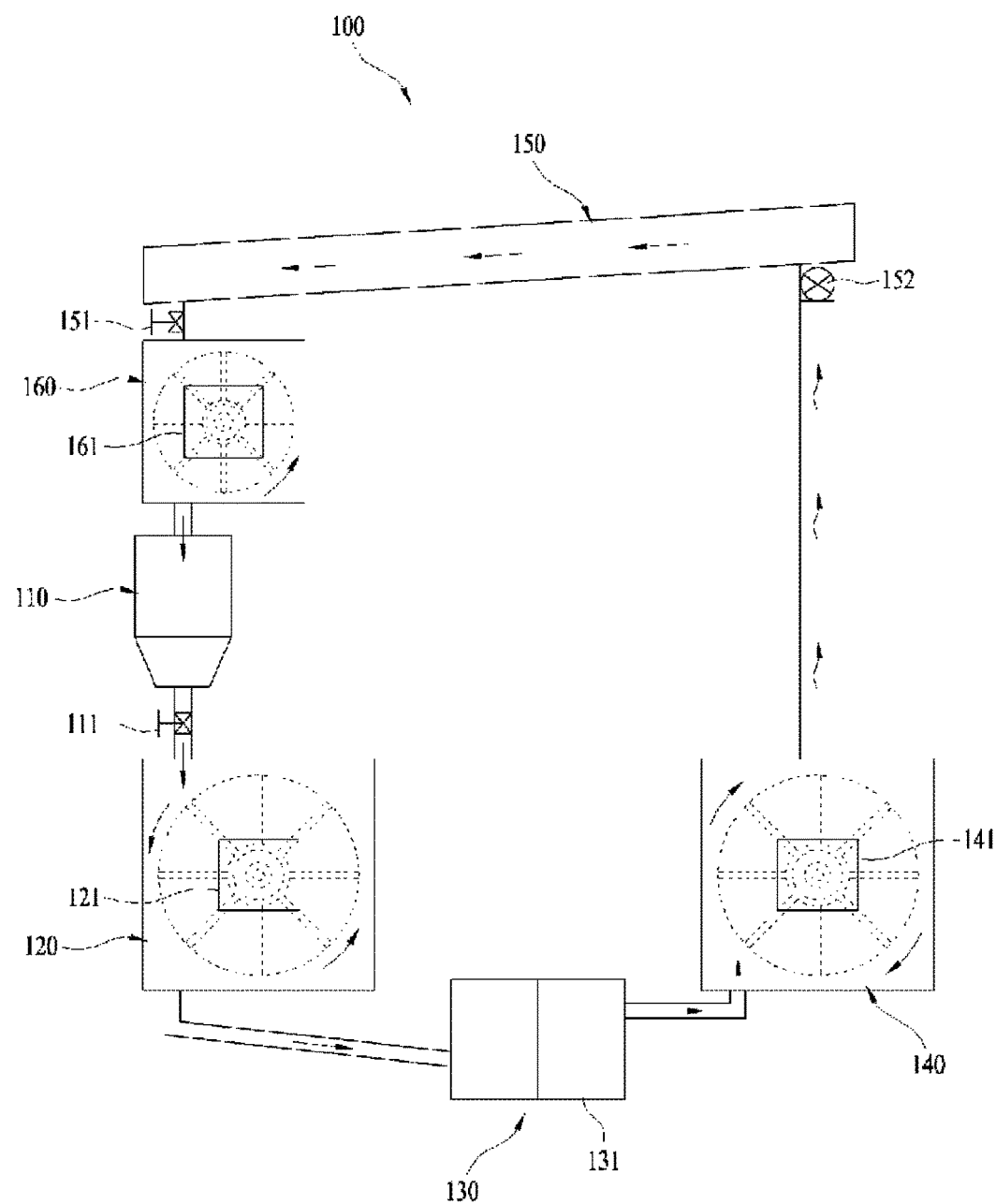
FIG. 2 is a front view illustrating an independent power generating method and a generating device thereof using water pressure and vapor according to the present invention.

Hereinafter, an exemplary embodiment of the present invention will be described with reference to the accompanying drawings. As shown in FIGS. 1 to 2, an independent power generating device using water pressure and vapor is configured to include a water tank 110 disposed at a predetermined height so as to have potential energy; a first water wheel 120 disposed at an exhaust side of the water tank 110 to vertically face the water tank 110 and to rotate by head drop of water, an electric generator 121 being coupled to a rotating shaft thereof; a heating boiler 130 disposed to communicate with a lower portion of the first water wheel 120 to generate vapor by heating inlet water; a vapor wheel 140 disposed to rotate by high-pressure vapor ejected by communicating with a vapor exhausting end of the heating boiler 130, an electric generator 141 being coupled to a rotating shaft thereof; a condensing tank 150 mounted at an upper side of the vapor wheel 140 to have a first side communicating with the vapor wheel 140 so as to condense vapor and to allow condensate water to flow toward a second side to exhaust it; and a second water wheel 160 disposed to downwardly communicate with an exhaust side of the condensing tank 150, to rotate by head drop of the condensate water, the electric generator 121 being coupled to a rotating shaft, and to downwardly communicate with the water tank 110.

The water tank 110 is mounted at a predetermined height to store a predetermined amount of water, and is disposed at a lower side of the second water wheel 160 to continuously receive water from the second water wheel 160.

Further, a control valve 111 is coupled to the water tank 110 at a lower side thereof to supply the stored water to the lower side at a predetermined supply rate.

The first water wheel 120 is mounted at the lower side of the water tank 110 to communicate with each other to rotate by potential energy of the water that is downwardly supplied from the water tank 110 and to couple the electric generator 121 to the rotating shaft thereof so as to generate power by a toque of the first water wheel 120.

Herein, a casing may be disposed to surround the first water wheel 120 while closing and sealing an external surface of the first water wheel 120.

The heating boiler 130 includes a vapor generator 131 which communicates with the first water wheel 120 to rotate the first water wheel 120, and then receives and heats the water that drops to the lower side to generate high-pressure vapor and ejects it through an exhaust pipe that communicates with the vapor wheel 140.

Further, the heating boiler 130 may be formed at a side of the first water wheel 120 to be lower than the first water wheel 120 such that the exhaust pipe is slantly formed to naturally receive water from the first water wheel 120.

The vapor wheel 140 communicates with the vapor generator 131 of the heating boiler 130 to rotate by receiving the high-pressure vapor ejected through the exhaust pipe and couples the electric generator 141 to the rotating shaft thereof so as to produce power.

Herein, a casing may be disposed to surround the vapor wheel 140 which closing and sealing an external surface thereof, and a typical nozzle and the like may be disposed at an ejection end of the exhaust pipe to exhaust the high-pressure vapor.

In addition, the vapor wheel 140 upwardly communicates with a first side of the condensing tank 150 to exhaust the vapor that is used for rotating the vapor wheel 140.

The condensing tank 150 communicates with an upper side of the vapor wheel 140 at a first side thereof such that a check valve 152 is formed in the connection pipe to facilitate introduction of the vapor that comes up after the vapor wheel 140 is rotated, into the condensing tank 150 and to prevent the vapor introduced into the condensing tank 150 from flowing backward.

Furthermore, the vapor introduced into the condensing tank 150 is condensed to flow therein toward a second side thereof so as to downwardly supply water at a predetermined supply rate by allowing a lower portion of a second side of the condensing tank 150 to communicate with an upper portion of the second water wheel 160 with a connection pipe and coupling a control valve 111 to the connection pipe.

In addition, a typical condensing fan, condensing piece, or condensing net for inducing easy condensation of the vapor may be provided in various complex ways in the condensing tank 150.

The second water wheel 160 communicates with the lower portion of the second side of the condensing tank 150 to rotate by potential energy of the condensate supplied from the condensing tank 150, and generates power by coupling the electric generator 161 to the rotating shaft of the second water wheel 160.

Herein, a casing may be disposed to surround the second water wheel 160 while closing and sealing an external surface of the second water wheel 160.

Further, the water tank 110 is disposed at a lower side of the second water wheel 160 to communicate with the second water wheel 160 to supply the water that downwardly drops after the second water wheel 160 is rotated, to the water tank 110.

Hereinafter, an independent power generating method using water pressure and vapor according to the present invention will be described.

The independent power generating method using water pressure and vapor includes a first power generating operation includes, when water is filled in the water tank 110 and a predetermined amount of water is allowed to vertically downwardly flow, water pressure depending on potential energy of the flowing water is applied to the first water wheel 120 to rotate the first water wheel 120, and thus-generated toque is applied to the electric generator 121 connected with a rotating shaft of the first water wheel 120 to generate first power; a high-pressure vapor supplying operation in which water that completes first power generation in the first power generating operation is allowed to flow in the heating boiler 130, the water introduced into the heating boiler 130 is heated to generate high-pressure vapor by using the vapor generator 131 and to supply it to the vapor wheel 140; a second power generating operation in which a pressure of the vapor ejected in the high-pressure vapor supplying operation is applied to the vapor wheel 140 to rotate the vapor wheel 140, and thus-generated torque is applied to the electric generator 141 connected with a rotating shaft of the vapor wheel 140 to generate second power; a vapor condensing operation in which water that completes second power generation in the second power generating operation is exhausted to the condensing tank 150, and the vapor introduced into the condensing tank 150 is condensed; a third power generating operation in which condensate water obtained by condensing the vapor in the vapor condensing operation is allowed to vertically downwardly flow, water pressure depending on potential energy of the flowing water is applied to the second water wheel 160 to rotate the second water wheel 160, and thus-generated toque is applied to the electric generator 161 connected with a rotating shaft of the second water wheel 160 to generate the third power; and the third power generation circulating operation in which water that completes third power generation in the third power generating operation is allowed to flow in the water tank 110 to perform a continuous power generation circulating operation on the water.

Meanwhile, the independent power generating device 100 according to the present invention may be installed in an external wall of a factory or a building, and the condensing tank may be largely formed in a rooftop thereof to perform sufficient condensation.

Furthermore, in which power is continuously generated by sequentially circulating water through water head drop and high-pressure vapor, it is possible to continuously perform independent power generation by using minimum energy obtained by heating water in the heating boiler 130 to generate vapor Particularly, water resource is hardly dissipated since power is generated by using natural head drop of water caused by water gravity and vapor and the vapor is re-used by naturally arising and condensing it.

What is claimed is:

1. An independent power generating device using water pressure and vapor, comprising:
    a water tank disposed at a predetermined height to have potential energy;
    a first water wheel disposed at an exhaust side of the water tank to vertically face the water tank and to rotate by head drop of water, an electric generator being coupled to a rotating shaft thereof;
    a heating boiler disposed to communicate with a lower portion of the first water wheel to generate vapor by heating inlet water;
    a vapor wheel disposed to rotate by high-pressure vapor ejected by communicating with a vapor exhausting end of the heating boiler an electric generator being coupled to a rotating shaft thereof;
    a condensing tank mounted at an upper side of the vapor wheel to have a first side communicating with the vapor wheel with a connection pipe so as to condense vapor and to allow condensate water to flow toward an another side to exhaust it; and
    a second water wheel disposed to downwardly communicate with an exhaust side of the condensing tank to rotate by head drop of the condensate, the electric generator being coupled to a rotating shaft, to downwardly communicate with the water tank,
    wherein a check valve is installed in the connection pipe to facilitate introduction of the vapor that comes up after the vapor wheel is rotated into the condensing tank and to prevent the vapor introduced into the condensing tank from flowing backward, and
    wherein a lower portion of a second side of the condensing tank communicates with an upper portion of the second water wheel with the connection pipe and a control valve is coupled to the connection pipe to downwardly supply water at a predetermined supply rate.

2. An independent power generating method using water pressure and vapor, comprising:
    a first power generating operation in which, when water is filled in a water tank and a predetermined amount of water is allowed to vertically downwardly flow, water pressure depending on potential energy of the flowing water is applied to a first water wheel to rotate the first water wheel and thus-generated toque is applied to an electric generator connected with a rotating shaft of the first water wheel to generate first power;
    a high-pressure vapor supplying operation in which water that completes first power generation in the first power generating operation is allowed to flow in a heating boiler, the water introduced into the heating boiler is heated to generate high-pressure vapor by using a vapor generator and to supply it to a vapor wheel;
    a second power generating operation in which a pressure of the vapor ejected in the high-pressure vapor supplying operation is applied to the vapor wheel to rotate the vapor wheel, and thus-generated torque is applied to an electric generator connected with a rotating shaft of the vapor wheel to generate second power;
    a vapor condensing operation in which water that completes second power generation in the second power generating operation is exhausted to a condensing tank and the vapor introduced into the condensing tank is condensed;
    a third power generating operation in which condensate water obtained by condensing the vapor in the vapor condensing operation is allowed to vertically downwardly flow, water pressure depending on potential energy of the flowing water is applied to a second water wheel to rotate the second water wheel and thus-generated toque is applied to an electric generator connected with a rotating shaft of the second water wheel to generate third power; and
    a power generation circulating operation in which water that completes third power generation in the third power generating operation is allowed to flow in the water tank to perform a continuous power generation circulating operation on the water,
    wherein in the vapor condensing operation, a check valve is controlled to prevent the vapor introduced into the condensing tank from flowing backward.

* * * * *